US006965448B2

(12) United States Patent
Blasius

(10) Patent No.: US 6,965,448 B2
(45) Date of Patent: Nov. 15, 2005

(54) PRINTING MACHINE WITH REGULATED MONITORING OF SETTINGS AND METHOD OF CONTROLLING A PRINTING MACHINE

(75) Inventor: Udo Blasius, Leimen (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 859 days.

(21) Appl. No.: 09/842,956

(22) Filed: Apr. 25, 2001

(65) Prior Publication Data

US 2001/0035965 A1 Nov. 1, 2001

(30) Foreign Application Priority Data

Apr. 25, 2000 (DE) ................................ 100 20 156

(51) Int. Cl.[7] ................................................ G06F 15/00

(52) U.S. Cl. ..................... 358/1.15; 358/1.1; 358/1.16; 358/1.13; 358/3.28

(58) Field of Search ......................... 358/1.1, 448, 450, 358/3.28, 1.13–1.17; 714/31; 709/224; 382/100, 382/232–233

(56) References Cited

U.S. PATENT DOCUMENTS 5,361,696 A 11/1994 Kato et al. .................. 101/232
5,815,652 A * 9/1998 Ote et al. ..................... 714/31

FOREIGN PATENT DOCUMENTS

DE 40 00 295 C2 5/1994

OTHER PUBLICATIONS

Japanese Patent Abstract No. 3-190647 (Teruhisa Komuro), dated Jan. 19, 1993.

* cited by examiner

*Primary Examiner*—Twyler Lamb
(74) *Attorney, Agent, or Firm*—Laurence A. Greenberg; Werner H. Stemer; Ralph E. Locher

(57) ABSTRACT

The printing machine has at least one central unit with a memory or other data carrier for data processing, a controlled electronic machine controller, and at least one machine element connected to the machine controller. The system allows, upon installation, setup and adjustment of the printing machine rapid recognition of errors, so that options for correction are automatically offered. At least one file for playback of optical and/or acoustical help instructions is stored in the memory and associated with at least one machine element, machine function, and/or functional or setting error. The file is activatable via the central unit, which is connected to optical and/or acoustical output devices. Upon activation, the help instructions are played back. For each machine element or each machine function needed at that precise time, or for each functional or setting error which is displayed just at that time, the associated file with the appropriate help instruction is called up.

18 Claims, 1 Drawing Sheet

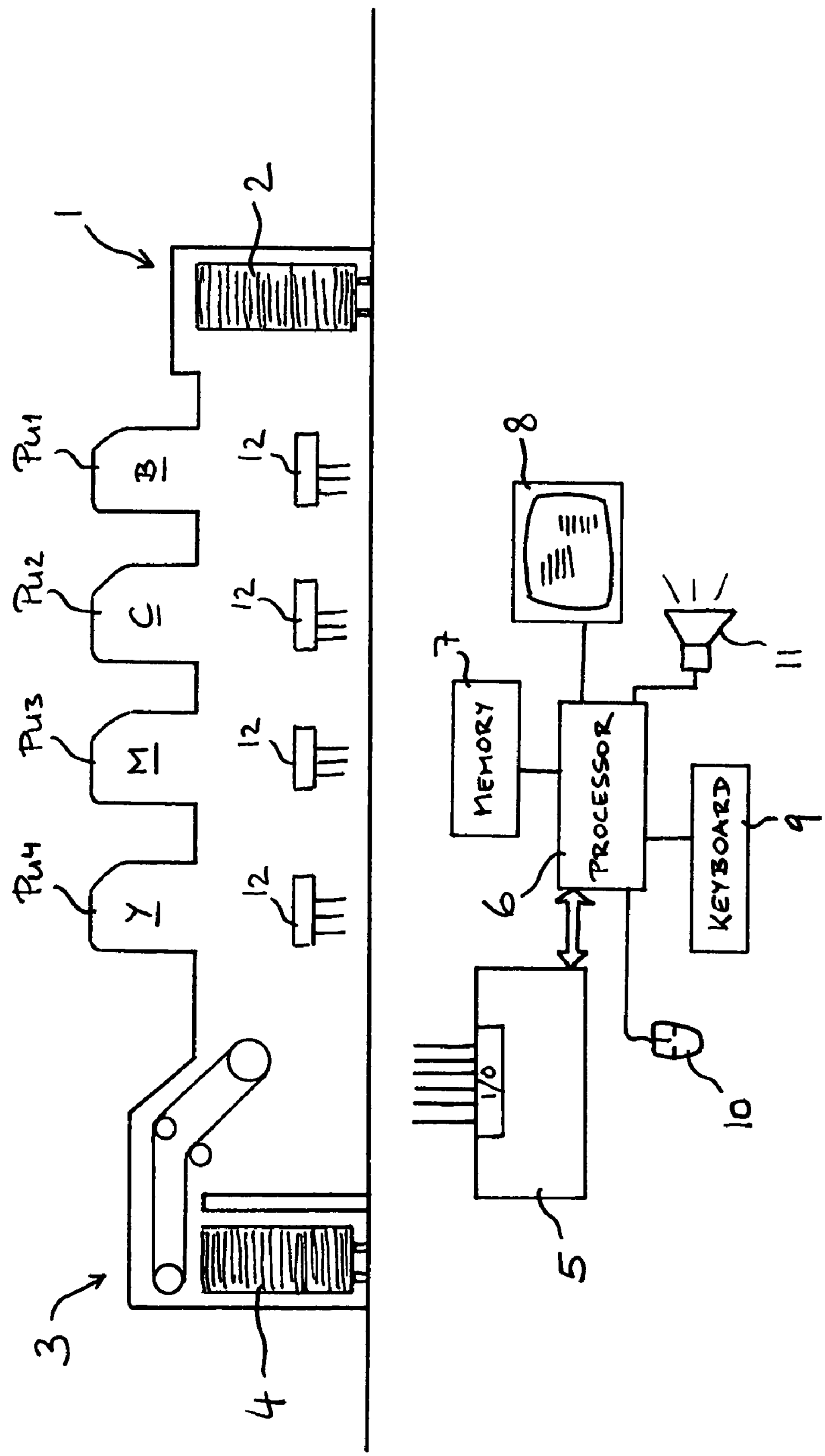
1
2
Pu1
B
Pu2
C
Pu3
M
Pu4
Y
12
12
12
12
3
4
8
7
MEMORY
PROCESSOR
KEYBOARD
6
9
11
I/O
5
10

PRINTING MACHINE WITH REGULATED MONITORING OF SETTINGS AND METHOD OF CONTROLLING A PRINTING MACHINE

BACKGROUND OF THE INVENTION

Field of the Invention

The invention lies in the printing technology field. More specifically, the invention relates to a printing machine having at least one central unit with a memory for data processing and a controlled electronic machine controller, and having at least one machine element connected to the machine controller. The invention further pertains to a method for controlling such a printing machine.

Printing machines of the generic type are well known to those of skill in the art and they belong to the prior art. The machine elements and functions are input by operators using data processing means and are stored in memory. The subsequent printing process is thereupon determined largely by the configuration made and performed in accordance with the printing data.

When the printing machine is first installed or when it is configured, errors often occur, especially with insufficiently skilled workers. This can be due to incorrect input of the machine or setting data or if the wrong data are input. The printing machine then will usually still execute the printing process, but the print quality is useless because of the erroneous settings.

When new printing jobs are to be set up at the printing machine, ascertaining the correct settings often requires multiple trials by operators to arrive at the correct settings. Not until the test prints achieve satisfactory quality is the printing process started. This process of trial and error entails a considerable expenditure of time and material, with the attendant disadvantages in terms of cost. Often, however, incorrect settings go unrecognized because they could not be ascertained in the test prints, for instance because they are not apparent until mass-production printing is done. This can mean that entire batches are misprinted.

As a rule, such disadvantages can be minimized with computer-aided help functions that can be activated by the operator. Especially with unskilled operators, such help functions are of no use, since often the setting error that causes a misprint is unknown. It has therefore been demonstrated, disadvantageously, that in computer-aided help functions, misprints cannot be avoided entirely, since the operators must select the help instructions pertinent to the particular settings from many help instructions. The search is time-consuming and expensive and is often unsuccessful anyway.

SUMMARY OF THE INVENTION

The object of the present invention is to provide a printing machine with regulated monitoring of settings and a corresponding method which overcome the above-noted deficiencies and disadvantages of the prior art devices and methods of this general kind, and which offer operators help for the installation, setup and setting of the printing machine, and wherein errors are detected quickly and options for correction are expediently offered.

With the above and other objects in view there is provided, in accordance with the invention, a control system for a printing machine having at least one machine element, the control system comprising:

a central data processing unit;

an electronic machine controller connected to and controlled by said central data processing unit;

at least one controlled machine element of the printing machine connected to and controlled by said electronic machine controller;

a data carrier, an input device, and an output device connected to said central data processing unit;

said data carrier storing at least one data file for playing back instructions associated with at least one machine element, one machine function, and/or a functional or setting error; and wherein the at least one data file is activatable via said central unit such that, upon activation of the file, the instructions are played back via the output device.

With the above and other objects in view there is also provided, in accordance with the invention, a method of controlling a printing machine having an electronic machine controller and at least one machine element connected to the controller, the method which comprises:

inputting configuration data and adjusting a setting of the machine controller;

checking the setting for errors with a central unit, and determining, with an error recognition procedure, whether an erroneous setting is present and associating the setting to a given machine function or machine element; and if an erroneous setting is present, activating a file associated with the machine function or the machine element by the central unit.

In other words, the above objects are attained in that at least one file for playing back optical and/or acoustical help instructions is stored in the data carrier and is associated with at least one machine element, one machine function, and/or a functional or setting error, and that the file is activatable via the central unit that is connected to optical and/or acoustical output means, and that upon activation of the file, the playback of the optical and/or acoustical help instructions takes place via the output means. Advantageously, the operators can call up the appropriate file with the appropriate help instruction for each machine element or each machine function needed just at that time, or for each functional or setting error that is displayed just at that time.

According to the invention, the files are audio, video, HTML, text and/or image files. It is thus possible to store the applicable data in a storage medium of a computer, or the data may be transferred via a real-time transmission.

An advantageous embodiment is furnished by the provision that the output means include at least one screen display and/or one speaker. With the screen display, picture and text reproductions in particular, are possible. Acoustical reproductions are possible through the speakers. An especially advantageous feature has both elements combined. Thus video files can be played with audio reproduction. Upon activation, audio files reproduce a spoken text via output means such as speakers. It is furthermore possible, via speech recognition, to reproduce texts from text files by means of speech elements generated by the computer. Via screens, HTML, text, picture and video files that store instructions and examples can be output.

A further advantageous feature is attained in that the input means is touch- or light-sensitive, and preferably is a screen, a film, a keyboard, and/or a sensor. This makes it possible for the input of the setting and configuration data and the callup of files for reproducing the help functions can be adapted to the work environment.

Advantageously, the files are activatable before, during and/or after the setting of the machine controller. This makes it possible for the operators to be supported quickly with help instructions for installation the first time the machine is put into operation. If configuration data are input incorrectly, it is possible to guide the workers through the various setting options and to display analyses of errors or suggestions for the correct input. After the setting has been done, functional errors in particular can be detected and displayed.

One preferred feature of the printing machine of the invention is attained in that in the event of a functional or setting error of a machine element or machine function, the particular associated file is activatable, preferably automatically, by the central unit. Thus assures that when individual machine elements are being set, such as the feeder, the print delivery system, the plate clamps and so forth are informed of all the presettings and operating means with regard to an incorrect setting. The automatic activation in the event of an incorrect setting has the advantage that the worker need not make a long search for the appropriate help file and instead this file is reproduced directly or in response to input. Thus not all the help instructions in existence for that particular machine element are activated but only the file that is concretely associated with the detected functional or setting error.

A further embodiment is furnished in that the central unit has means for recognizing errors in the machine controller, which means detect a functional and/or setting error of a machine element and activate the particular associated file. Advantageously, it is thus attained that the files are activated immediately upon detection of the error and directly by the means for error detection. Especially advantageously, a data processing program can be used as such a means; it controls the central unit so that the individually set parameters of the machine controller configuration are checked for their compatibility with the machine data and the printing data.

An advantageous feature of the invention is made available with a method for controlling a printing machine as described above. This is attained in that the configuration data are input via input means and the machine controller is set; that the setting is checked for errors by the central unit; that the central unit, with means for error recognition, detects an erroneous setting and associates with the machine functions and/or the machine elements; that the files associated with the machine functions and/or the machine elements are activated by the central unit if there is an erroneous setting.

This is advantageously attained in that the means for error recognition if an erroneous setting is detected automatically forwards a signal to the central unit, and that the central unit thereupon activates the file associated with the applicable machine functions and/or machine elements. An alternative to this is attained in that the input means upon actuation forwards a signal to the central unit; that the central unit thereupon checks the machine status for active machine functions and/or machine elements and activates the respective files associated with them. Advantageously, both variants can be executed during machine operation, preferably upon the setting of the machine controller.

Because the input is effected under menu control via the input means, preferably by means of a screen display, the further setup of the machine controller is advantageously supported.

The printing machine and the method according to the invention make it possible to implement new machine settings rapidly, because in the event of errors or problematic decisions, the operator is supported, under automatic or manual control, by the printing machine with help instructions. This is advantageously done by the display of text and graphic files, and video and audio files, which are reproduced or displayed directly by the speaker and/or the screen.

The data files displayed or represented are related to the error or the problematic decisions in the sense that they are associated with the machine elements or functions affected by the error or the decision, and are activated by the central unit without further action on the part of the operator. This can advantageously be attained in that when the error occurs, the central unit checks which machine element or function is affected, and the file already stored on a storage medium and associated with the detected machine element or function is activated. The checking as to which machine element or machine function is affected can advantageously be done by means of a LOG file which keeps a log of the operation of the printing machine or the course of data processing.

Especially preferred files are video files, which can be shown on conventional computer screens with suitable means, such as data processing programs. These displays make it possible to furnish extensive, detailed information to the operator in a clear way, and video and audio sequences can be played.

From simulated machine sequences, the central unit can ascertain and show what results of the printed picture are possible, at the existing machine setting or with the existing configuration of the machine controller. Optionally, incorrect settings can be detected and corrected by targeted help instructions and input options before the actual printing operation takes place. For installation of the printing machine, the help files and the association are preinstalled and can be called up under menu control, making one stage of operating instructions unnecessary. In the menu, a search can be made for terms that are each associated with files which are activated via a touch-sensitive screen or other input means.

The files and the requisite data processing programs are preferably stored on a preferably exchangeable data medium such as a CD-ROM. If the printing machine is expanded with further machine elements, then the old data medium can be replaced with a new one, which has been supplemented with the data associated with the new machine element and the machine functions involved with it.

The regulated monitoring of settings makes is possible to keep from putting the printing machine into operation until all the settings have been made correctly. If a setting does not match the specifications for the printing machine, the printing machine is not enabled for the printing job. To allow the operator to make the search for errors efficiently, a suitable file that indicates the error or the relevant help instruction to overcome the error is displayed or played back. To provide the operator with targeted information to overcome the error, provision is made for sources of error that are important or known to occur most frequently to be handled in the appropriate context. Secondarily, more-detailed information can be shown, preferably by means of further activatable files, which can be displayed in the event of repeat errors, for instance.

Other features which are considered as characteristic for the invention are set forth in the appended claims.

Although the invention is illustrated and described herein as embodied in a printing machine with monitored control settings and a method of controlling a printing machine, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawing.

BRIEF DESCRIPTION OF THE DRAWING

The sole FIGURE is a highly diagrammatic illustration of the system in which the process according to the invention is integrated.

DESCRIPTION OF THE PREFERRED EMBODIMENT

Referring now to the exemplary figure of the drawing in detail, the printing machine that is illustrated is a sheet-fed rotary printing press with four printing units PU1, PU2, PU3, and PU4. A feeder 1 feeds paper sheets from a stack 2 into the first printing unit PU1, which prints black onto the sheets. From there, the sheets travel through the other printing units PU where other colors are printed onto the sheets, such as, for example, cyan, magenta, and yellow. From the last printing unit PU4, the sheets are transported to a delivery 3, where they are stacked onto a delivery pile 4.

A multiplicity of machine elements are distributed throughout the printing press which are controlled for the purpose of setting the various color settings, color distribution, ink thickness, registration among the individual imprint stations, print speed, dampening content, and so on, to name just a few. These machine elements and sensors are connected to a central unit 5 which provides the press operator the necessary information and allows the operator to enter the necessary settings and control operations.

A processor 6 is diagrammatically illustrated with a memory 7. The memory 7 may be a hard drive, a CD optical disc, a floppy disc, or other data carrier. In this case, the data carrier may also be a real time connection and, in its broadest sense, the data carrier may also be a carrier wave of any transmission system. The processor is connected to a display 8, which may also be an input device, such as a touch screen. Other input devices include the keyboard 9 and the mouse 10. A speaker 11 represents the audible output system.

The central unit 5 is connected to an electronic machine controller 12 in each of the printing units. The controller 12 in turn is connected to one or more machine elements with which one of the various machine adjustments is effected. The controlled machine element may be any element whose setting influences the printing operation of the printing machine. The files on the data carrier 7 are associated with the respective machine element. When an error is detected in a setting or adjustment, the system plays back instructions associated with the machine element, machine function. The error may be functional and/or a setting error. The respective data file is activatable via the central unit, i.e. via the processor 6, so that, upon activation of the file, the instructions are played back via the output device 8 and/or the output device 11.

I claim:

1. A control system for a printing machine having at least one machine element, the control system comprising:

a central data processing unit;

an electronic machine controller connected to and controlled by said central data processing unit;

at least one controlled machine element of the printing machine connected to and controlled by said electronic machine controller;

an internal data carrier, an input device, and an output device connected to said central data processing unit;

said internal data carrier storing at least one data file for playing back instructions associated with at least one machine element, one machine function, and/or a functional or setting error; and wherein the at least one data file is activatable via said central unit such that, upon activation of the file, the instructions are played back via the output device.

2. The system according to claim 1, wherein said data carrier is a memory device of said central data processing unit.

3. The system according to claim 1, wherein the instructions are selected from the group consisting of optical and acoustical help instructions, and said output device is selected from the group consisting of optical and acoustical output devices.

4. The printing machine of claim 1, wherein the data file is selected from the group consisting of audio, video, HTML, and image files.

5. The printing machine according to claim 1, wherein said output device is selected from the group consisting of screen display and speaker.

6. The printing machine according to claim 1, wherein the input device is selected from the group consisting of touch-sensitive and light-sensitive input devices.

7. The printing machine according to claim 1, wherein the input device is selected from the group consisting of a screen, a film, a keyboard, and a sensor.

8. The printing machine according to claim 1, wherein the files are activatable before, during, and after a setting of the machine controller.

9. The printing machine according to claim 1, wherein said central unit is programmed to activate a particular associated file in the event of a functional or setting error of a machine element or a machine function.

10. The printing machine according to claim 1, wherein said central unit is programmed to automatically activate a particular associated file in the event of a functional or setting error of a machine element or a machine function.

11. The printing machine according to claim 1, wherein said central unit is configured to recognize errors in the machine controller, to detect an error of a machine element, and to activate the particular associated file.

12. The printing machine according to claim 11, wherein said central unit is configured to detect functional errors and setting errors of the machine element.

13. A method of controlling a printing machine having an electronic machine controller and at least one machine element connected to the controller, the method which comprises:

inputting configuration data and adjusting a setting of the machine controller;

checking the setting for errors with a central unit, and determining, with an error recognition procedure, whether an erroneous setting is present and associating the setting to a given machine function or machine element; and if an erroneous setting is present, activating a file associated with the machine function or the machine element by the central unit, the file being stored in an internal data carrier.

14. The method according to claim 13, wherein the error recognition procedure is a software procedure in the central unit.

15. The method according to claim 13, which comprises, when an erroneous setting is detected, automatically forwarding a signal to the central unit, and thereupon activating, with the central unit, the file associated with the applicable machine function or machine element.

16. The method according to claim 13, which comprises forwarding with input means upon actuation a signal to the central unit; thereupon checking with the central unit a machine status for active machine functions or machine elements, and activating a respectively file associated therewith.

17. The method according to claim 13, which comprises effecting an input under menu control via an input device.

18. The method according to claim 17, wherein the input device is a screen display.

* * * * *